United States Patent
Dziekan et al.

(10) Patent No.: US 6,728,887 B1
(45) Date of Patent: Apr. 27, 2004

(54) ARRANGEMENT FOR PROVIDING MEDIATED ACCESS IN AN HFC ACCESS NETWORK

(75) Inventors: Robert R. Dziekan, North Wales, PA (US); Nicholas D. Lee, King of Prussia, PA (US); Jonathan A. Weinstock, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/511,702

(22) Filed: Feb. 23, 2000

Related U.S. Application Data

(60) Provisional application No. 60/158,412, filed on Oct. 7, 1999.

(51) Int. Cl.[7] .................................................. H04L 9/32
(52) U.S. Cl. ....................................... 713/201; 709/225
(58) Field of Search .......................... 713/201; 709/229, 709/223, 224, 225, 226, 220, 221; 725/129; 455/26.1; 705/53

(56) References Cited

U.S. PATENT DOCUMENTS

| | | | | |
|---|---|---|---|---|
| 5,845,073 A | * | 12/1998 | Carlin et al. | 709/217 |
| 5,884,157 A | * | 3/1999 | Karmi | 455/406 |
| 6,061,332 A | * | 5/2000 | Branton et al. | 370/241 |
| 6,195,364 B1 | * | 2/2001 | Brodigan | 370/463 |

* cited by examiner

*Primary Examiner*—Gregory Morse
*Assistant Examiner*—Andrew Nalven
(74) *Attorney, Agent, or Firm*—Caroline Coker; Wendy Koba

(57) ABSTRACT

A hybrid fiber coaxial (HFC) access network manager is formed to include a mediated access system to control each service provider's ability to monitor, view and re-configure selected elements within the HFC access network. A database included within the manager contains a mapping between the information service providers and the various network elements for which each service provider is permitted access and/or control. With mediated access, an information service provider has the ability to monitor quality, perform diagnostic tests and configure that equipment which directly supports the provided services.

10 Claims, 14 Drawing Sheets

ARRANGEMENT FOR PROVIDING MEDIATED ACCESS IN AN HFC ACCESS NETWORK

Priority of Provisional Application Ser. No. 60/158,412, filed Oct. 7, 1999 is hereby claimed.

TECHNICAL FIELD

The present invention relates to a hybrid fiber/coax (HFC) access communication network and, more particularly, to an arrangement for providing mediated access for service providers in an HFC access communication network.

BACKGROUND OF THE INVENTION

Modern cable systems utilize a hybrid fiber/coax (HFC) architecture in which signals are distributed via a fiber optic connection to a node that converts the optical signal to an electrical signal, then distributes the signals to residences via a tree and branch coaxial cable distribution network. The distribution network comprises network elements such as coaxial cable, amplifiers, line extenders and taps. At the subscriber side, terminal equipment supports the delivery of cable services to subscribers. Cable services have evolved from video services to data and voice services, introducing at the same time new terminal equipment. The set-top box (STB) terminal equipment supports video services which include broadcast TV and interactive services such as video-on-demand (VOD) and "near" video-on-demand (NVOD).

Data and voice services are supported by cable modems and communication gateways, respectively, which also require the use of an upstream signal path. The network is provisioned as a bi-directional network by using a fiber optic return signal path from the node to the headend. A return band, typically designated at 5–42 MHz, is used to support transmissions from devices in the home (or located on the side of the home) back to the headend. Additional network elements may be placed inside the cable network to support service delivery or to monitor service quality. The cable modem is a network interface element for providing data services such as Internet access and other related services to the subscriber. A cable modem generally uses standardized communication methods based on Cable Labs' Data Over Cable System Interface Specification (DOCSIS) to access data services through the cable network. A cable modem termination system (CMTS) located at the HFC access network head end side provides an interface to the data network, as well as an interface to the cable modems. In particular, cable modems can be identified by one or more unique addresses including, but not limited to, a Media Access Control (MAC) address or an IP address.

A television set-top box supports video and data services that may be accessed through the television interface. Set-top functionality can also be extended to support telecommunications services including voice and video telephony. In a particular embodiment, an exemplary set-top box receives analog and digital signals on the downstream through the HFC cable plant, and can use a variety of communications techniques for return path communications, including telephone plant return, response to polling from the headend, or cable modem communications, including the use of DOCSIS-compliant or other cable modem technology. Set-tops are typically identified by a unique address which can be, as mentioned above, a MAC address. Another network element which can be monitored and managed is defined as a "communication gateway", where the communication gateway is located at or near the subscriber residence and functions to support a variety of voice and data services. An exemplary communication gateway comprises a cable modem along with a microprocessor, digital signal processing (DSP) unit, and other hardware required to support IP telephony services. Along with its IP telephony services support feature, a communication gateway can also perform ingress monitoring operations. The communication gateway may be located outside the residence, typically on the side of the house, or can be inside the home in a central location, such as a basement or attic. Alternatively, the communication gateway functionality can be incorporated into a television set-top.

A telephony test point (TTP) is a monitoring element placed at a specific point inside the cable plant and used to perform certain operations autonomously, or under the control of a network management system. The basic functions of the TTP are to monitor and control ingress, discover the topology of the cable network, and identify the ingress sources. The TTP is based on a communication gateway, without the telephony interfaces. In one embodiment, the TTP is equipped with a tunable spectrum analyzer to monitor ingress.

In the current network environment where multiple service providers utilize a common HFC communication network to transmit information to and receive information from a number of different subscribers, it is important to control each provider's access to various ones of the network elements so that one provider does not re-configure network elements in a way that would affect the performance of other service providers using the network.

Thus, a need remains for an arrangement capable of controlling/mediating each service provider's access to and control of various network elements within the HFC access network.

SUMMARY OF THE INVENTION

These and other needs remaining in the prior art are addressed by the present invention, which relates to a hybrid fiber/coax (HFC) access communication network and, more particularly, to an arrangement for providing mediated access for service providers in an HFC access communication network.

In accordance with the present invention, mediated access allows service providers access to certain aspects of the network and network devices, while denying access to other elements which a selected service provider does not own/control or, in general, require access to in order to provider the associated service. Using mediated access, a service provider has the ability to monitor quality, perform diagnostic tests, and configure equipment which directly supports the services they provide and for which they are contractually obligated to maintain.

In one embodiment of the present invention, a data service provider may have access to head end equipment including the CMTS, terminal equipment such as cable modems, and may also be able to view information regarding the transmission quality of the return path, as determined by telephony test points (TTPs) within the network and the head end. However, the data service provider would be denied access to transmission path equipment such as line amplifiers and fiber optical equipment (where a video service provider would be permitted access to such network equipment).

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
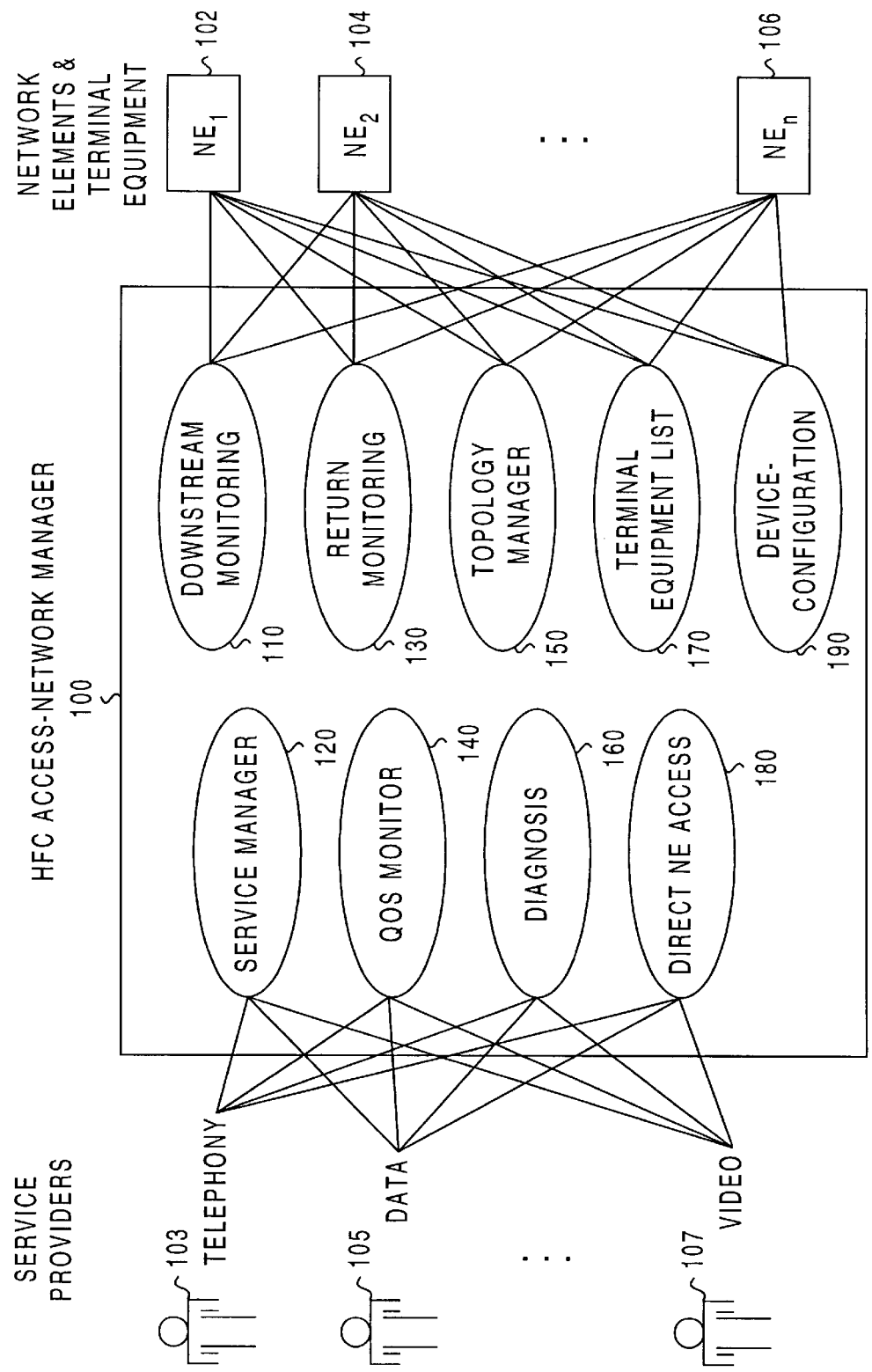
FIG. 1 contains a simplified use case diagram of an HFC access network management system, useful in implementing the topology discovery process of the present invention.

Before described in detail the mediated access arrangement of the present invention, it is useful to understand the hybrid fiber/coax network environment within which such a mediated access arrangement may be employed. An exemplary use case diagram for an HFC access network manager (HAM) 100, for use with an associated set of service providers, as well as network elements, is illustrated in FIG. 1. As shown, the exemplary service providers include telephone (e.g., voice) service providers 103, data service providers 105, and video (cable) service providers 107. It is to be understood that these specific service providers are exemplary only, and an HFC network is capable of supporting information flow from/to any desired type of service provider. Further, one "provider" may encompass the capability to provide each of the three types of services depicted in FIG. 1. For the sake of discussion, however, these providers are separately parsed. The network elements and terminal equipment, simply illustrated in FIG. 1 as "$NE_i$" and denoted by reference numerals 102, 104, . . . , 106, include equipment at the head end, equipment in the field including fiber optic, electrical and other transmission equipment, and terminal equipment including set-tops, cable modems, telephony units and any other communication equipment located at or near the subscriber location.

As will be discussed in detail below, service providers 103, 105, . . . , 107 interact with manager 100 and are able to provision services, monitor the quality of service, perform diagnostic checks and (under certain, controlled circumstances in accordance with the mediated access arrangement of the present invention) permit direct access to certain network elements. Network elements 102, 104, . . . , 106 utilize various monitoring modules within manager 100 to perform the functions of, among others, downstream monitoring, return monitoring, and topology discovery and management. Although not specifically illustrated in FIG. 1 (for the sake of clarity), it is to be understood that there exist multiple interconnections between the "service"-connected elements and the "network element"-connected modules within manager 100.

In particular, a service manager 120 within HAM 100 is coupled to each provider and allows all service providers 103, 105, . . . 107 the ability to create a communication transport pipe from each of their respective information sources to one or more network elements. Service manager 120 also allows for a direct association between certain service providers and certain network elements, useful, as will be discussed below, with direct network element access element 180 and the mediated access arrangement of the present invention. In particular, service manager 120 maps specific services and service providers to specific network elements, where the specific elements may either be owned or controlled by the related service provider and through which the associated service is provided. For example, service manager 120 allows a cable TV service provider 107 to offer video services to a specific set-top terminal equipment element (for example, network element 104). Service manager 120 also allows a telephone service provider 103 to provision and operate telephony services over the HFC network, these telephony services typically including connection from a traditional circuit switch or an Internet telephony switch to a network element such as a communications gateway (e.g., network element 106) that supports telephone services. For data services, a data service provider 105, such as an Internet service provider (ISP), will provide interconnectivity between the Internet and a cable modem (e.g., network element 102) which is connected to a computer. Additionally, service manager 120 can determine if a service provider is authorized to access management information base (MIB) objects of the network elements and receive reports of the network elements' failures.

A diagnosis element 160 within manager 100 allows any of service providers 103, 105, . . . , 107 to determine the root cause of faults in the HFC access network. Diagnosis element 160 takes information received from network elements 102, 104, . . . , 106 and processed by other entities (such as, for example, downstream monitoring module 110) and determines where a fault may exist in the network. Diagnosis element 160 allows the launching of queries into the system wherein the authorized service providers can request diagnostic tests on the network elements to determine their "health". In a particular embodiment, diagnosis element 160 can, on demand, run pre-defined tests to determine the root cause of network problems detected by a subscriber. As an example, a subscriber experiencing a low throughput on his cable modem (e.g., modem 102) can call his service provider (e.g., data provider 105) who can, in turn, request diagnostic tests through diagnosis element 160. As discussed in detail below in association with the teachings of the present invention, each service provider has access to only certain pre-defined sets of diagnostic tools to locate faults in the network. In some circumstances, a service provider may not have access to certain network elements such as, for example, line amplifiers, which may not be the responsibility of that specific service provider.

A quality of service (QoS) monitor 140 within manager 100 allows service providers 103, 105, . . . , 107 to monitor the quality of its delivered communication service, which in many cases is based on the accurate delivery of digital information and to report network performance to subscribed service providers. QoS monitor 140, in an exemplary embodiment, passively monitors the HFC access network to determine the health of the various network elements and can asynchronously send network health information to authorized service providers. QoS monitor 140 is thus concerned with collecting network performance metrics such as bit error rate (BER), frame error rate (FER), throughput at selected devices, and reporting the collected data to the subscribed service providers.

As mentioned above, certain service providers are permitted to access a selected set of network elements that they own and/or control. A direct network element access element 180 is included in HFC access network manager 100 to control the interaction between the service providers and associated network elements, according to pre-defined contractual arrangements. Direct network element access element 180 also provides a view of the "state" of a link between two identified network elements. A service provider, upon passing security tests, can then used Web-based or SNMP V.3-based management tools to access various ones of its owned/controlled network elements.

As mentioned above, manager 100 also includes a plurality of monitoring modules that directly communicate with various network elements 102, 104, . . . , 106 to aid in the management of the HFC access network. In particular, a downstream monitoring module 110 is included in manager 100 and used to collect bit error information from various network elements and terminal equipment. Downstream monitoring module 110 then uses this bit error information to determine if the equipment is operating correctly. For example, set-tops within the network may be polled to determine if data has been correctly received. Telephony test points (TTPs), as discussed hereinafter, may be located at various locations and depths within the HFC network, where these test points may also be polled or interrogated to determine if the bit error rate of data received at the test points is acceptable. Downstream monitoring module 110 can thus process this information and determine the extent to which data is being received accurately in the downstream path.

In a similar fashion, a return path monitoring module 130 is used to determine if data is being accurately transmitted in an upstream path from a network element to the headend. Return path monitoring module 130 collects information from a variety of network elements including telephony test points and headend equipment, including CMTS equipment, to determine if the return path is accurately carrying the data. Return path monitoring may include, for example, measurements of BER, lost frames, endless ranging, carrier-to-noise (C/N) ratios, and other measurements that may be made at either the physical or MAC level layers.

A device-configuration module 190 is used in manager 100 of the present invention to allow service providers (e.g., 103, 105, . . . , 107) to set specific parameters of the network elements (e.g., 102, 104, . . . , 106) for operation or test purposes. As an example, diagnosis element 160, upon receiving a query from, for example, data service provider 105, can use device-configuration entity 190 to set the network elements (for example, cable modem 102) in a test mode. Device-configuration entity 190 can also be used by service manager 120 to configure certain pre-defined parameters of the network elements.

A topology manager 150 within manager 100 contains an accurate representation of the topology of the HFC access network. In accordance with the present invention, topology manager 150 is further capable of updating the topology as elements are either added to or deleted from the HFC access network. A terminal equipment list 170 is also maintained within manager 100, where list 170 is generated to include all of the terminal equipment coupled to the HFC access network, including end user equipment such as set-tops, cable modems, telephony equipment, and "field equipment" such as line amplifiers, nodes and telephony test points.

It is advantageous to be able to monitor the status of the HFC forward and return paths in terms of their ability to deliver reliable data across the network. This ability, as described and claimed in applicants' copending application Ser. No. 09/511,090 filed of even data herewith, is dependent on the noise present along the HFC plant and can be determined using different methods, each of which detect "symptoms" of an unreliable path. In particular, different methods of ingress monitoring and detection can be used at various locations in the cable network. "Ingress", in general, can be thought of as noise from the surrounding environment that enters either a downstream (forward) or upstream (return) communication path. Ingress is particularly problematic on the return path, where more that 50% of ingress has been determined to enter the path from the residential environment.

Figure 2:
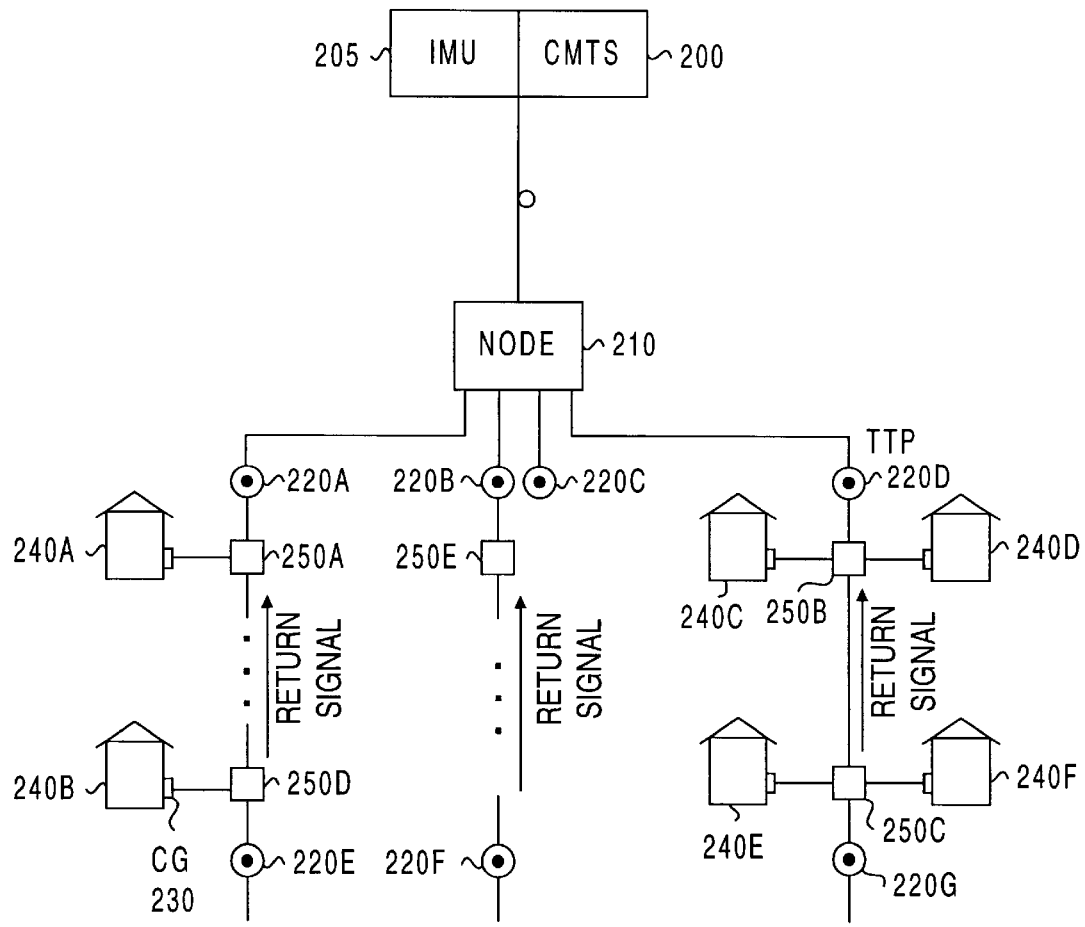
FIG. 2 illustrates in particular return path monitoring in an HFC access network.

Referring to FIG. 2, an exemplary portion of an HFC network is illustrated, where this particular diagram is useful in terms of describing the process of return path monitoring as disclosed and claimed in our copending application. A cable modem termination system (CMTS) 200 and ingress monitoring unit (IMU) 205 are illustrated as disposed at the "root" of the network tree and branch architecture. These elements, as they interact with the various network elements described below, thus perform the return path monitoring as described in association with return path monitoring module 130 of FIG. 1.

An optical fiber communication path 203 is illustrated in FIG. 2 as coupling CMTS 200 and IMU 205 to an exemplary node 210, where a number of different coaxial communication branches are thereafter connected to node 210 (i.e., "downstream" from node 210). The branches comprise the coaxial communication paths of the HFC network, and each illustrated branch includes a telephone test point 220. In particular, branch A communicates with a plurality of residences 240, where a plurality of taps 250 are used to interconnect each residence 240 to branch A via a communication gateway 230 disposed adjacent to each residence 240. Branches B, C and D also contain coaxial connections to additional residences 240 via a plurality of taps 250, as shown in FIG. 2. A telephony test point (TTP) 220A, used to monitor ingress on branch A, is disposed as shown at the top of branch A. Similar TTPs are disposed at the top of each branch B, C and D. In the embodiment as shown in FIG. 2, a second plurality of TTPs 220E, 220F, and 220G are disposed "downstream" of the illustrated residence taps, where this second plurality of TTPs is used to monitor residences located further downstream (not shown) and therefore provide more efficient sectionalization of the HFC network.

A direct consequence of excessive ingress is a high bit error rate (BER) or high frame error rate (FER). A count of the transmission errors can determine the reliability of the return path. This count can be performed at the data link layer, or at the physical layer. At the data link layer, the MAC layer performs a cyclic redundancy code (CRC) check, and any frames with errors are dropped. An excessive transmission error can be declared when the number of dropped frames exceeds a pre-determined frame error rate (FER). Monitoring at the MAC layer can be performed by IMU 205.

Alternatively, this monitoring can be performed at any TTP 220, or at any residential communication gateway 230, if "privacy" controls are not implemented and if the specific channel parameters are known to TTP 220 or communication gateway 230. At the physical layer, syndromes can be computed to detect an error pattern and thus count the number of errors that occur during transmission. Other BER measurement techniques can also be used.

Another consequence of excessive ingress inside the cable plant is an endless ranging in setting or adjusting cable modem transmitted power for reliable detection at CMTS 200. Endless ranging occurs when CMTS 200 continuously directs a power level change in order to detect the cable modem transmitted power. In one particular embodiment of the present invention, IMU 205 performs ingress monitoring and shifts corrupted carriers to a cleaner channel. In this case, return path monitoring module 130 (see FIG. 1) can direct the spectrum analyzer within the affected TTP 220 to measure the noise level in the channel left vacant. Alternatively, TTPs 220 can monitor the upstream (return) path in the analog domain and determine the signal quality in terms of signal-to-noise ratio (SNR). In this embodiment, TTP 220 can measure the noise level within a channel during its vacancy period. The distributed architecture of the network elements in the HFC network, when combined with the time division multiplexed access (TDMA) communication in the return path, create channel vacancies along the path monitored by a TTP. The channel vacancy occurrence can be predicted from the network topology (topology manager 150) and from the DOCSIS map information obtained by TTP 220. This embodiment applies a slot monitoring method, as discussed below, wherein a vacant channel corresponds to a non-used TDMA slot. Any signal measured on the vacant channel is assumed to be noise. The ingress level on the vacant channel can then be measured and the SNR determined.

Figure 3A:
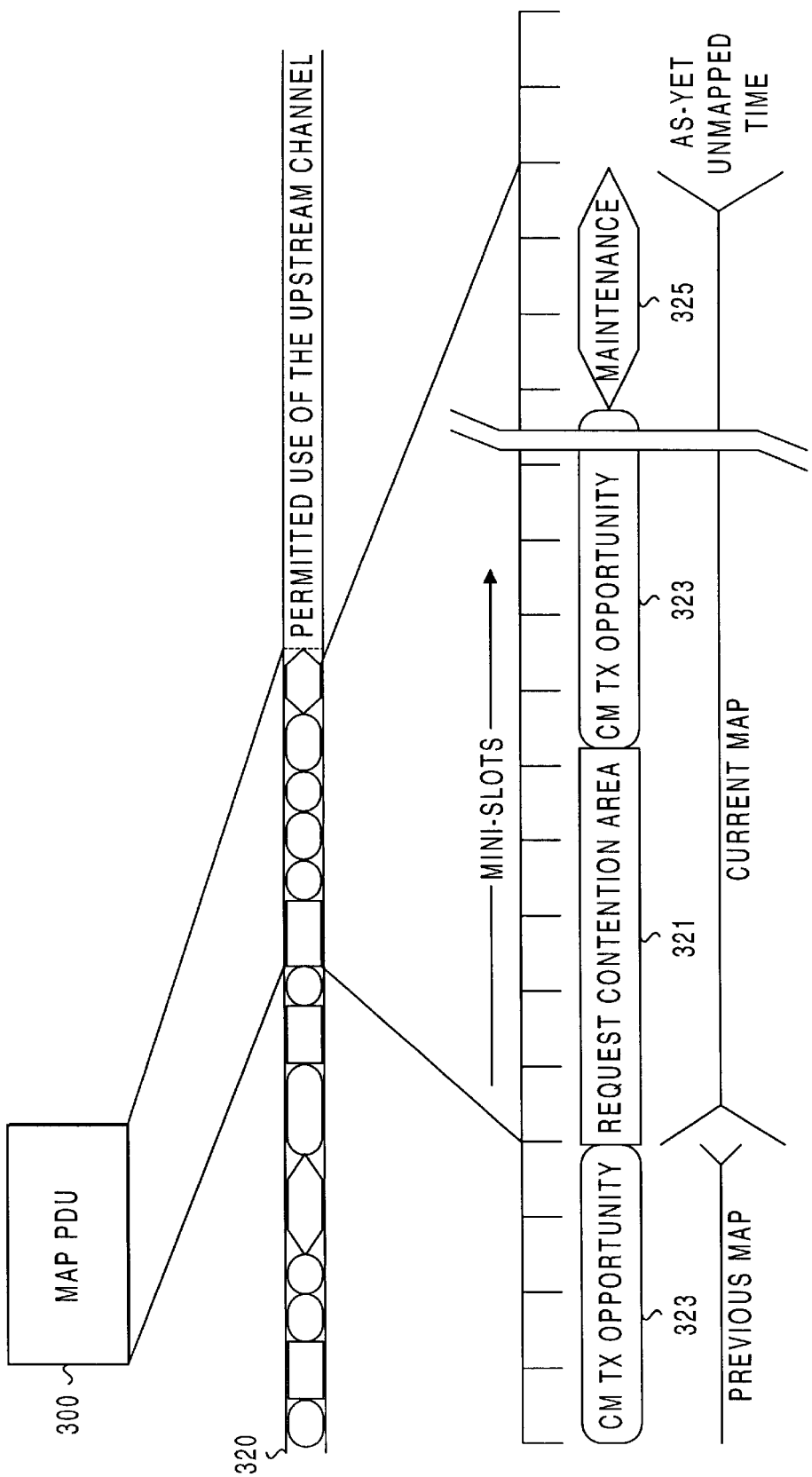
FIGS. 3A and 3B contain time slot diagrams related to providing return path monitoring within the time slots.
Figure 3B:
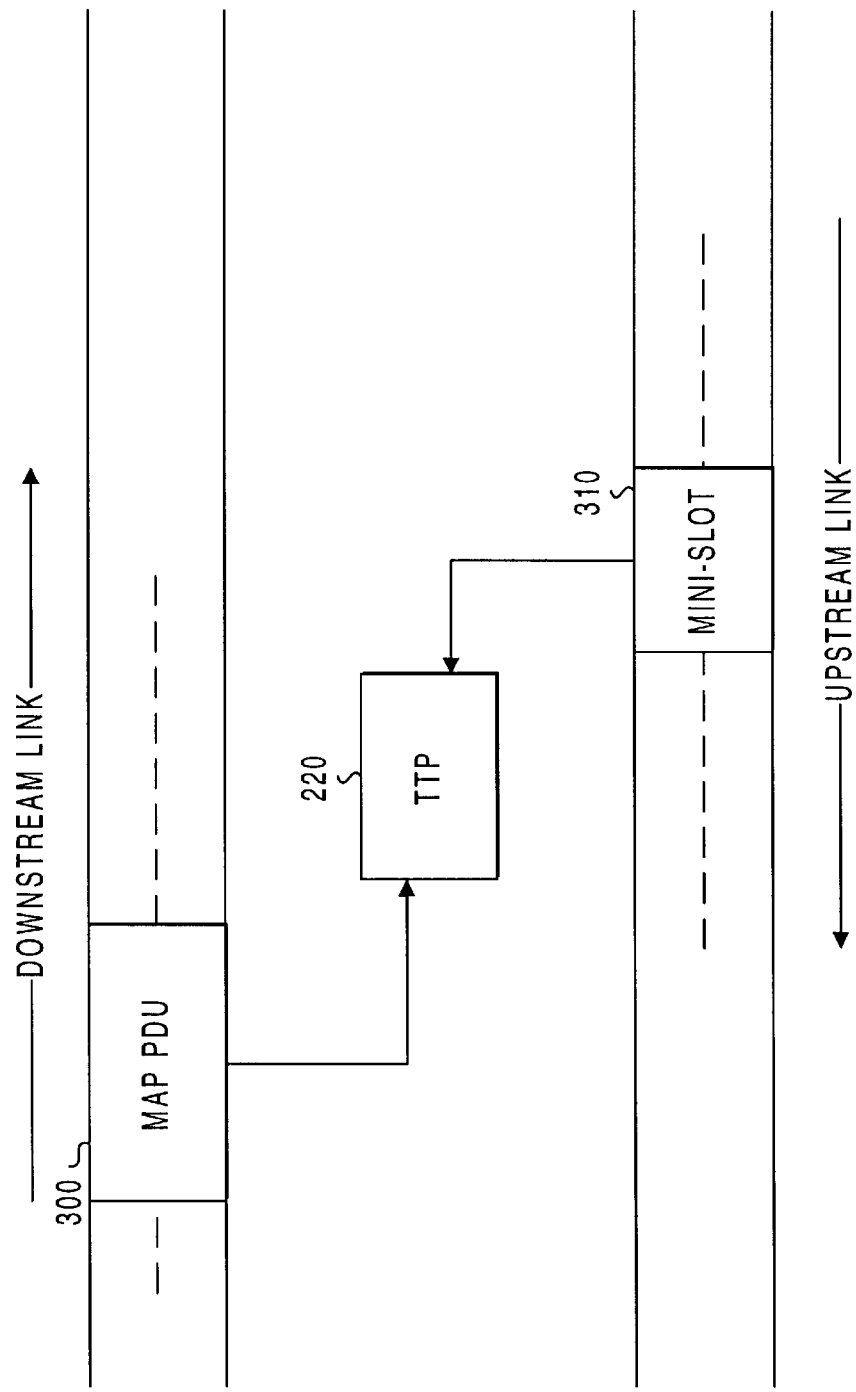

FIGS. 3A and 3B illustrate an exemplary bandwidth allocation map (MAP) transmitted by CMTS 200 to define channel usage in the upstream (and downstream) path. A MAP protocol data unit (PDU) 300 contains an information element defining the allowed usage for a range of mini-slots 310. As illustrated in FIG. 3A, the transmit opportunities define time slots that may be allowed for transmission by the DOCSIS-based devices. In this embodiment and as diagrammed in FIG. 3B, TTP 220 parses MAP PDU 300 to retrieve information on all time slots usage and determine their vacancy period based on the topology. Referring to FIGS. 3A and 3B, a TTP 220 reads a MAP PDU 300 on the downstream link to find vacant channel locations and sets its receivers to monitor that portion of the upstream link as described by MAP PDU 300. In this embodiment, the transmit opportunity for each time slot is known to TTP 220 which can then measure the noise level when the time slot is idle. It then infers, from the signal level and SNR, if that time slot is being used by a DOCSIS-based device. Referring to FIG. 3A, upstream channel usage map 320 includes, in a relevant portion, the MAP PDU 300 as discussed. Within mini slots 310 of the map are "request contention" mini slots 321, cable modem transmission mini slots 323 and maintenance mini slots 325.

Figure 4:
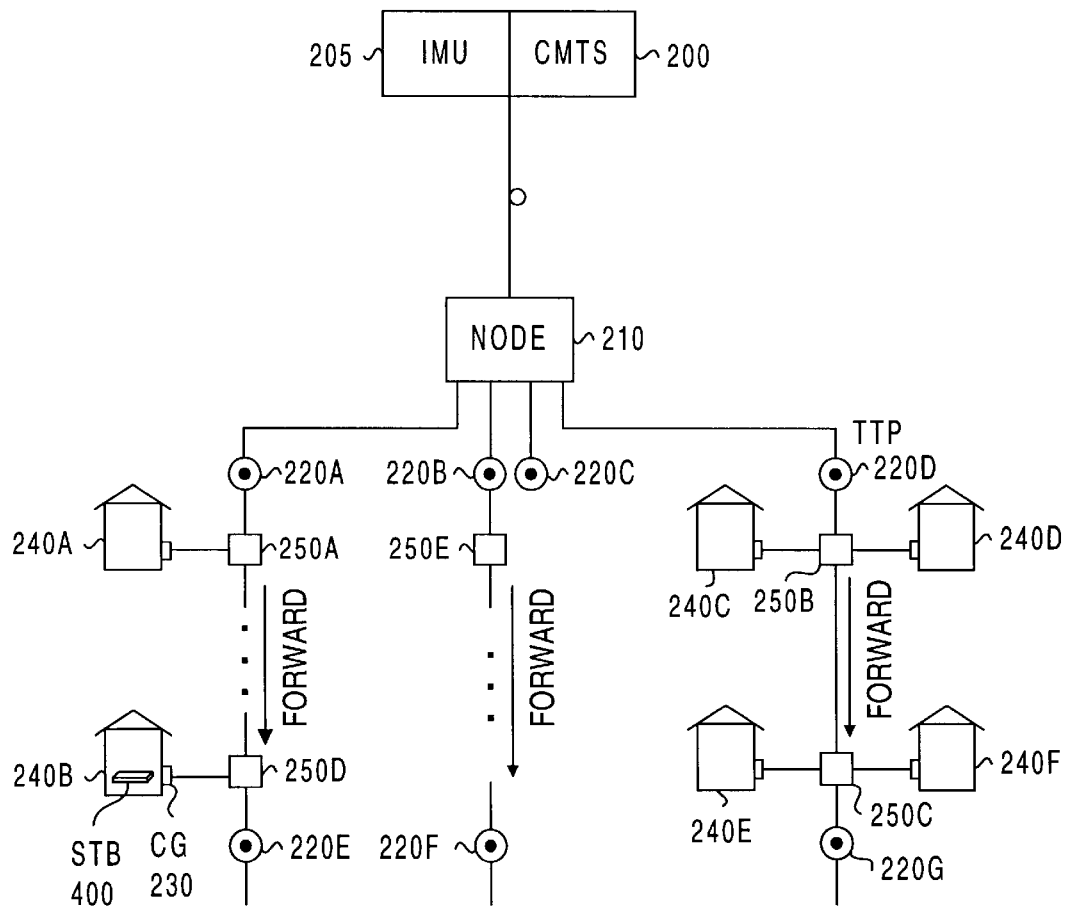
FIG. 4 illustrates in particular forward path monitoring in an HFC access network.

HFC access-network manager 100, as discussed above, can also be used to perform "forward" path monitoring. FIG. 4 illustrates the same exemplary portion of the HFC network as illustrated in FIG. 2, in this case the forward path direction is illustrated. In particular, forward path monitoring involves the terminal equipment within each residence 240, such as a set-top box 400, in association with DOCSIS elements and TTPs 220. Each forward path can be monitored at the physical or MAC layer using performance metrics such as BER or FER. Other measurements can also be performed on the downstream analog or digital signal and include carrier to noise ratio (C/N) and signal level measurements.

In one embodiment, terminal equipment such as cable modems 410 or set-top boxes 400 are polled and their performance metrics are transmitted to downstream monitoring module 110 of manager 100. HFC access-network manager 100 can discover the network portion shared by the devices which have low performance metrics, using the topology discovery method of the present invention as discussed in detail below. With the affected portion of the network "discovered", the elements causing the fault can be sectionalized and thus isolated from the rest of the network. In an alternative embodiment, a measurement can be made of the voice quality at a communication gateway 230. That is, since the basic function of communication gateway 230 is to interface the voice channel, a measure of the voice quality can determine the reliability of the downstream path. Although known techniques, such as the subjective Mean Opinion Score (MOS), the ETSI E-Model and the objective Perceptual Speech Quality Measure (PQSM) are typically used for testing purposes, an objective method such as the PSQM can be used for measuring voice quality in an initialization period or periodically during transmission.

As discussed above, HFC access network manager 100 of the present invention can comprise a network of monitoring devices, such as telephony test points (TTPs) 220 placed at strategic locations in the network architecture to monitor different "downstream" portions of the network. As will be discussed in detail below, TTPs 220 are extensively used in the topology discovery process of the present invention. Depending upon the architecture, manager 100 can identify a distribution cable (e.g., A, B, C or D) or a drop cable (e.g., a, b, c or d) as being the entry point of the ingress. In the case where all monitoring is performed at the head end (i.e., at CMTS 200), the minimum resolution is at the node (TTP) level. In other cases, the resolution can be minimized down to the home level, as will be described hereinbelow in association with FIGS. 5A–5C.

Figure 5A:
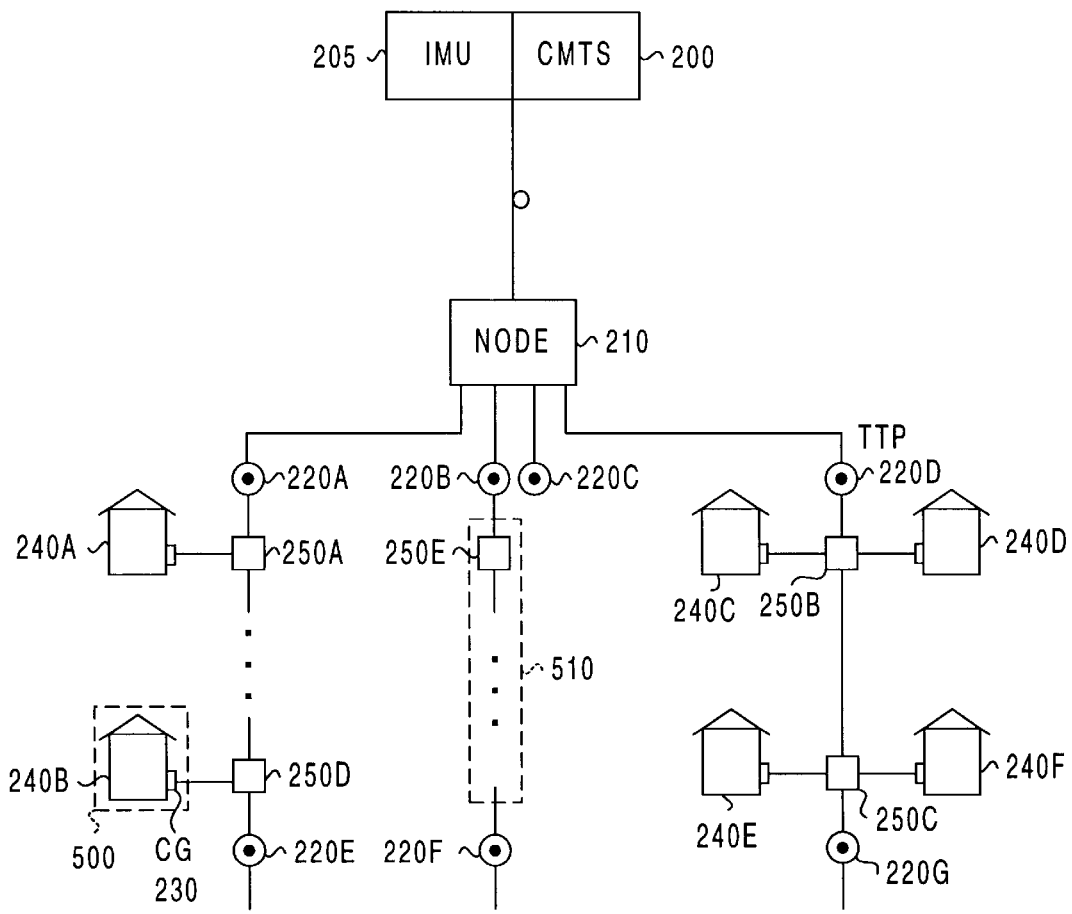
FIGS. 5A, 5B and 5C illustrate an exemplary sectionalization process used to identify a fault location within an HFC access network.

The cable architecture shown in FIG. 5A contains a layered set of monitoring points. A monitoring point at the head end is defined as being at the "top" of the layers and is represented by ingress monitoring unit (IMU) 205. A first layer of monitoring points, referred to as a first layer of TTPs are present at the top of each branch A through D, just below node 210. While monitoring at IMU 205 sees all of the ingress existing throughout the cable plant, TTPs 220A–220D see only a portion of the cable plant and, therefore, only the ingress coming from that portion. For example, if TTP 220B detects a significant level of ingress, it can be presumed that the source is along branch 510 of the network. TTP 220B can then feed that information back to IMU 205 and CMTS 200, where corrective action may be taken. As an alternative to using TTPs 220 for monitoring ingress, a communication gateway 230 at a residence 500 may be used to track the upstream signal coming from the residence. In this instance, any home injecting excessive ingress can be detected and isolated from the network.

Figure 5B:
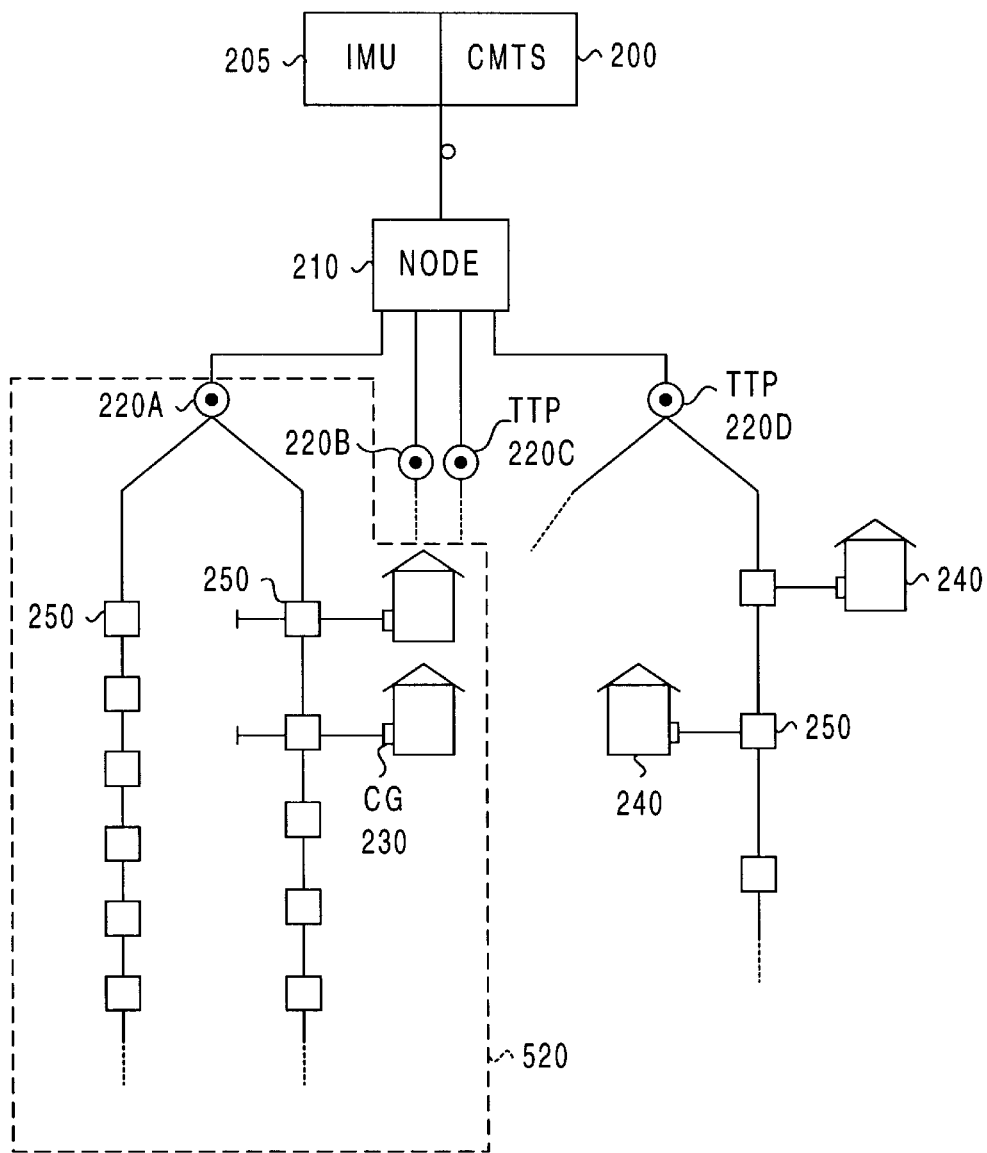

FIG. 5B illustrates an alternative ingress monitoring arrangement using only a single layer of TTPs 220 with CMTS 200 and IMU 205 to sectionalize the source of ingress. As shown, this arrangement is capable of identifying a main distribution cable, in this example, cable 520, that is causing excessive ingress. When the ingress is coming from a leaky distribution cable 520, TTP 220A at the top of distribution cable 520 can detect it and isolates distribution cable 520 (as indicated by the dotted line) from the rest of the HFC network. As with the arrangement of FIG. 5A, each communication gateway 230 may also perform ingress monitoring and be able to identify a particular residence as a source of ingress, passing this information along to CMTS 200 and IMU 205. The detection of ingress can be performed using the methods previously described and the faulty network portion can be identified by use of a localization algorithm.

Figure 5C:
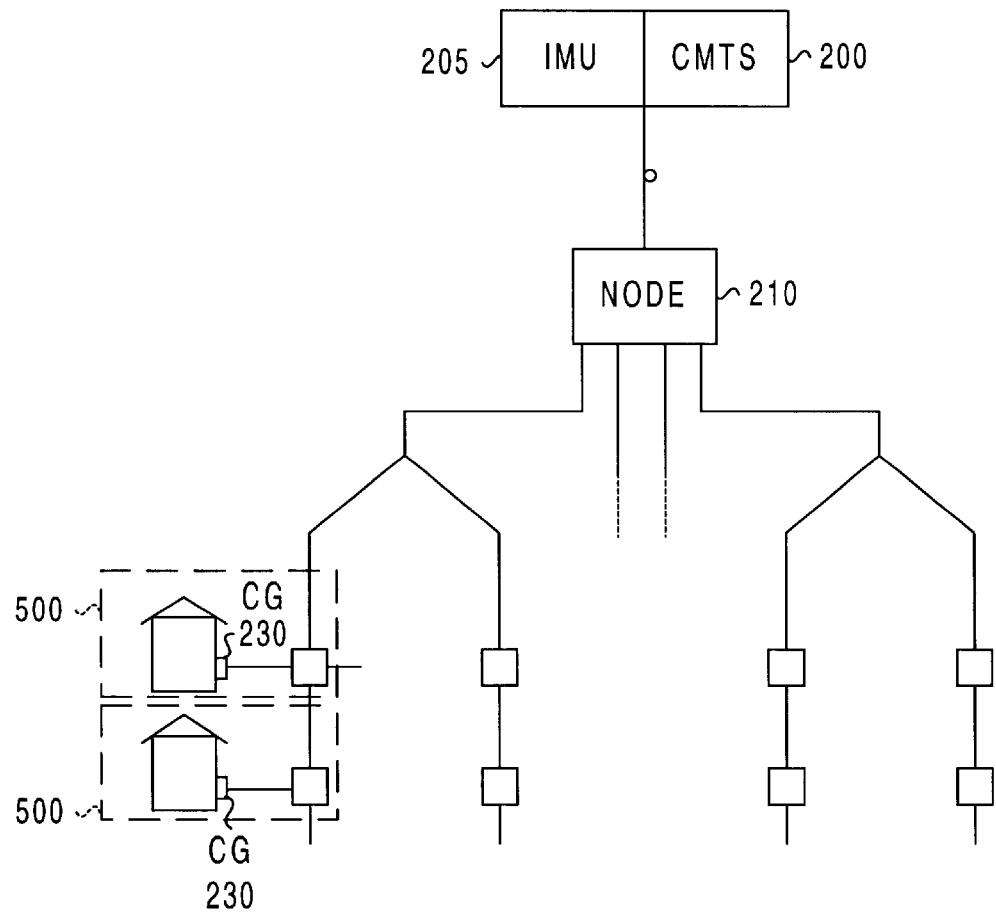

A solely "subscriber-side" monitoring arrangement for providing ingress detection in association with the present invention is shown in FIG. 5C. As shown, there are no TTPs used in this configuration, and instead each communication gateway 230 is solely responsible for detecting and reporting ingress. In one embodiment, IMU 205, upon receiving a report of a noisy frequency band or channel, reports this to manager 100 (see FIG. 1), which then polls communication gateways 230 to monitor that particular frequency band.

The different HFC network monitoring arrangements described above in association with FIGS. 5A, 5B and 5C allow diagnosis element 160 of manager 100 to localize different ingress entry points in the cable network and sectionalize the affected portion of the HFC network, within the resolution allowed by the particular network configuration. Methods for localizing the entry points can be based on a flow-through algorithm, which identifies a point in the tree and branch architecture of the HFC network. Alternatively, a parallel approach can be used to identify a leaky distribution cable.

Figure 6A:
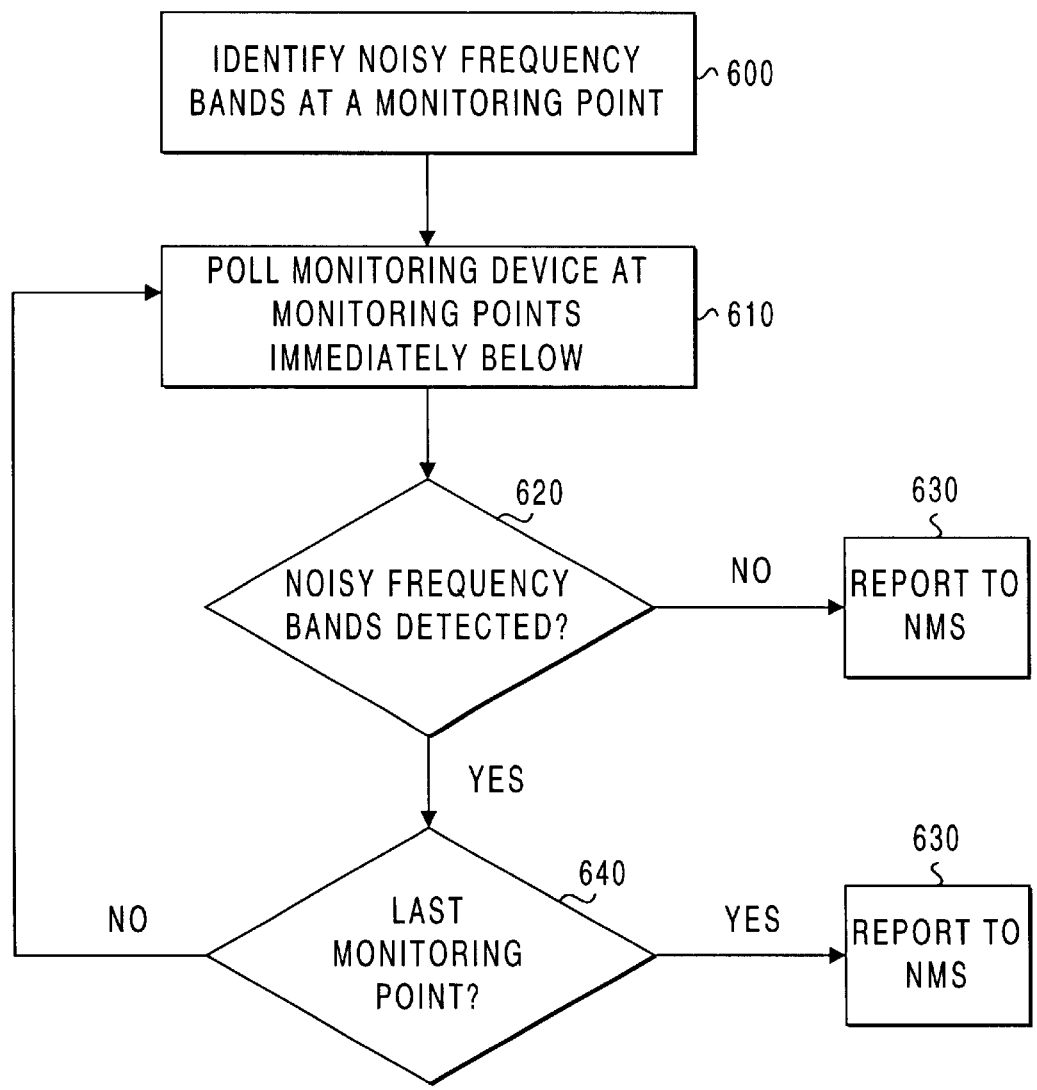
FIG. 6A contains a flow chart of an exemplary process used to identify the noise location in an HFC access network.

In particular, flow-through methods are well-suited for plant monitoring configurations having a hierarchy of monitoring devices, such as the TTPs distributed as shown in FIG. 5A between IMU 205 and the plurality of communication gateways 230. In understanding the flow-through method, the flow chart of FIG. 6A is useful. In particular, the identification process of step 600 can occur at any monitoring point within the network. Upon detecting a noisy frequency band at a particular point (for example, at TTP 220D of FIG. 5A), the monitoring points immediately below are polled to monitor the same frequency band (step 610 of FIG. 6A). As illustrated in FIG. 6A, a loop is iterated until the last monitoring point in the hierarchy is reached. The monitoring devices then report to manager 100 the results of this frequency band monitoring operation. In particular, at step 610 TTP 220G, located "below" TTP 220D would be polled. If the noisy frequency band is not present at this node, then at step 630 the process would report to manager 100 the identity of TTP 220D as the lowest source of the noisy channel. Alternatively, if the noisy channel were still present at TTP 220G, the process would continue to step 640 of the flowchart, which inquires to determine if TTP 220G is the "lowest" test point in the branch. If not, the process will loop back to step 610 and continue to monitor at lower locations (such as, for example, the communication gateways 230 disposed below TTP 220G), ultimately reporting to manager 100 the identity of the test point closest to the source of ingress.

Once the location of a noisy channel has been identified, manager 100 directs the monitoring of the return path (using return path monitoring module 130) to determine the location of the leaky portion of the HFC network. In a preferred embodiment, terminal equipment list 170 within manager 100 contains the physical addresses of all monitoring devices and their hierarchy (as known by topology manager 150). HFC access-network manager 100 of the present invention can thus direct the monitoring of a channel when it receives a report of an unreliable path.

Figure 6B:
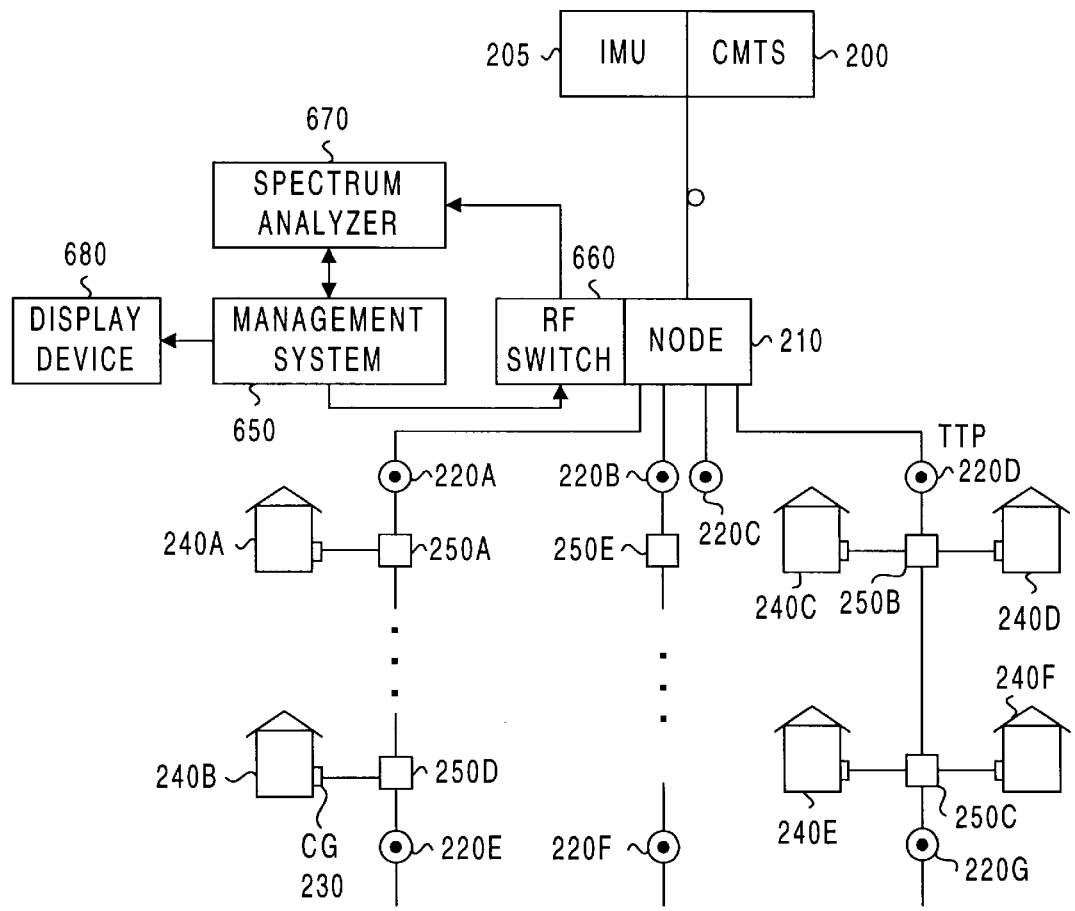
FIG. 6B illustrates an exemplary monitoring arrangement that may be used in association with the process outlined in FIG. 6A to identify the noise source.

FIG. 6B illustrates an exemplary arrangement for providing ingress localization. In this configuration, monitor 100 uses a parallel monitoring approach with a monitoring device (for example, a TTP 220) placed at each distribution amplifier within the HFC network. This parallel monitoring arrangement can work in conjunction with a visual monitoring center where the network architecture is displayed on an electronic board, PC screen, or any other suitable display device. In this embodiment, TTPs 220 monitor the return path and transmit the status of the return path at their monitoring point to a visual monitoring center such as display device 680. The status of the return path can be expressed by the SNR, BER, FER or the noise level within the upstream channels as defined by spectrum analyzer 670. The visual monitoring center can set different alarm thresholds, via management system 650, corresponding to the degree of degradation of the return path at the monitoring points. An RF switch 660, disposed at node 210, can be used to switch between branches A, B, C and D, thus providing monitoring of a number of different branches in parallel. The result of such plant monitoring is shown on the display, which includes a visual indication of the status of each monitoring point. In this monitoring method, the physical address of each TTP within the network is known and a mapping between the TTP logical address and its physical address is performed to display its status on the display device.

As discussed above, a significant aspect of HFC access network manager 100 is its ability to isolate the portion of the network where the ingress enters the network once such ingress has been detected (or, alternatively, a high error rate is detected in a particular frequency band). Therefore, knowledge of the network topology is an important factor in isolating the sources of ingress. In accordance with the present invention, network elements and terminal equipment (such as cable modems and communication gateways) can be "discovered" by their nearest TTP 220 on the upstream direction. TTPs 220 can thus identify the downstream DOCSIS network elements attached to them by monitoring the upstream path, in either the analog or digital domain.

In particular, an auto-discovery process can be used to ascertain the network topology, as discussed in applicants' copending application Ser. No. 09/511,087. This method uses the DOCSIS MAC management messages to discover downstream neighbor information. That is, an exemplary TTP 220 reads the MAC messages sent by CMTS 200 and retrieves information on upstream channels. The information includes upstream channel ID, mini-slot size, time stamp and scheduling information for upstream transmission contained in the UCD, SYNC and MAP messages, which are described in the DOCSIS specifications. The MAC management messages header contains a destination address which can be DOCSIS MAC address.

Figure 7A:
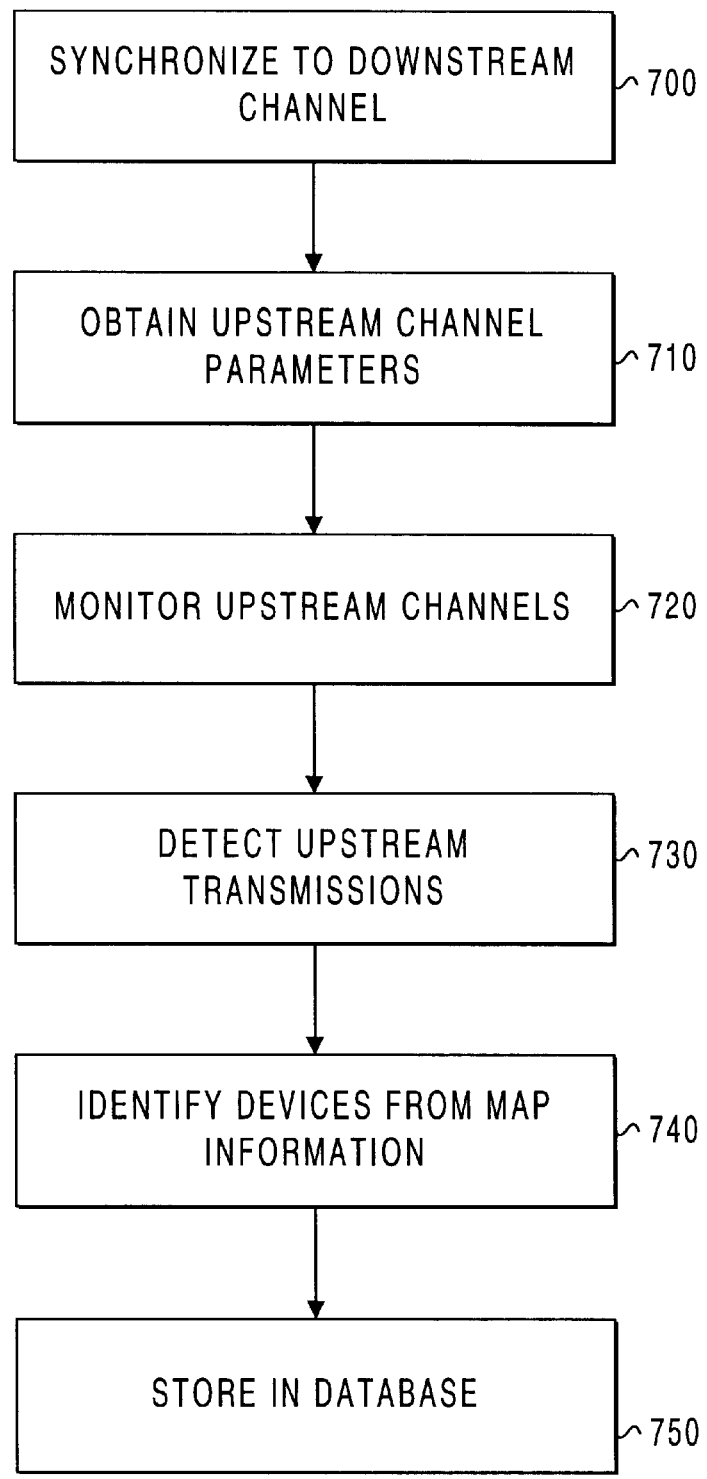
FIG. 7A contains a flow chart illustrating an exemplary topology discovery method associated with the HFC access network manager.

FIG. 7A contains a flowchart defining an exemplary topology auto-discovery method which performs in the analog domain. In this embodiment, TTP 220 synchronizes to a downstream channel (block 700) and obtains the channel's parameters from the MAC management messages. After obtaining the upstream channel's parameters (block 710), TTP 220 sets its upstream receivers to monitor the upstream channels (block 720). Upon detecting a signal on a monitored channel (block 730), TTP 220 can, with its knowledge of channel assignment gained from the MAP information, identify the particular device that is transmitting the detected signal (block 740). As illustrated in FIG.

7A, the addresses of the detected devices are stored in a database (block 750). In a preferred embodiment, the database is associated with topology manager 150. After a sufficiently long period of time, the database will therefore contain the addresses of each network element.

Figure 7B:
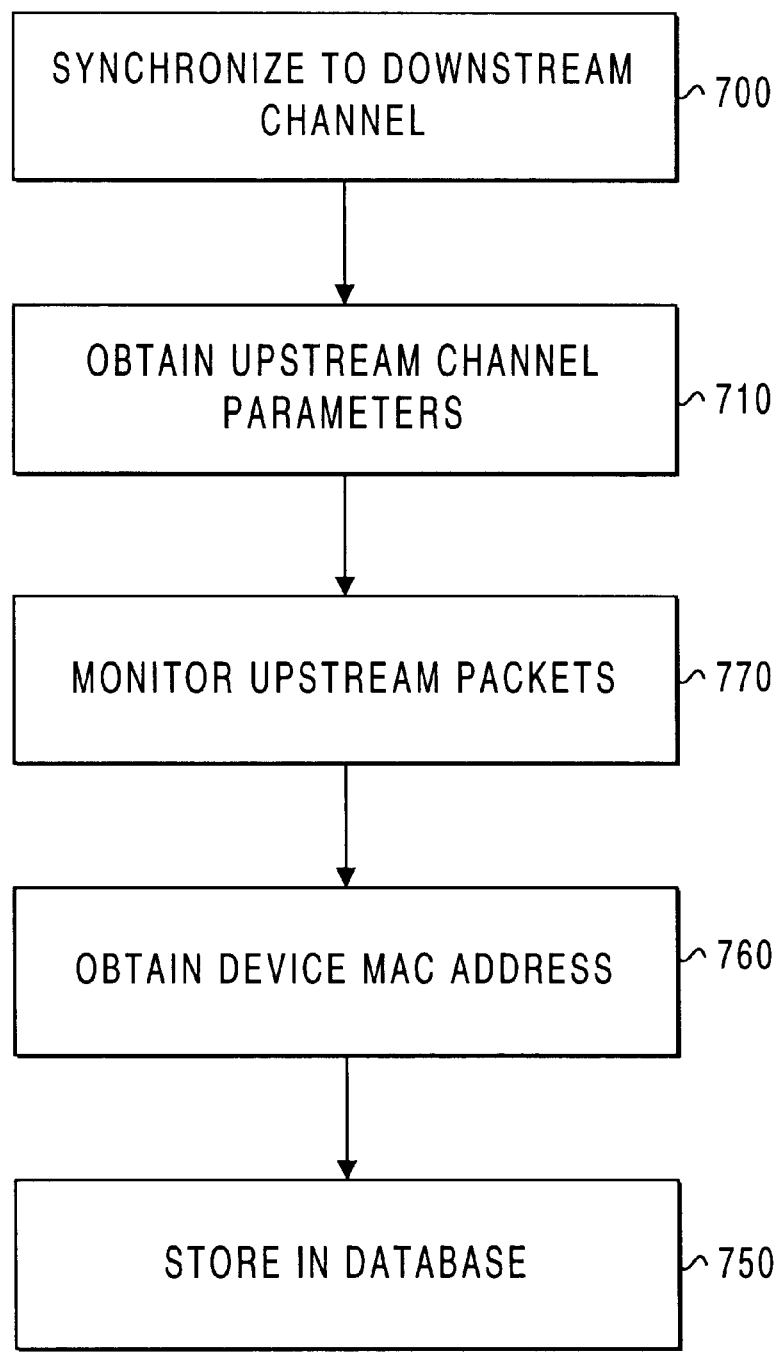
FIG. 7B contains a flow chart illustrating an alternative topology discovery method.

As mentioned above, topology auto-discovery can also be performed in the digital domain (if certain privacy restrictions are not used by the cable modems in the network). The flowchart of FIG. 7B illustrates an exemplary topology discovery process in the digital domain. In this embodiment, a TTP 220 functions as a packet "snooper" by looking over the packets sent in the upstream channels to obtain the MAC address of each downstream device. As shown, TTP 220 first synchronizes to a downstream channel (block 700), just as in the analog process. Also as in the analog process, TTP 220 then obtains the channel's parameters from the MAC management messages (block 710). After obtaining the upstream channel's parameters, TTP 220 can then set its upstream receivers to monitor the channels (block 770) and retrieve the MAC address contained in the packets sent (block 760). The set of MAC addresses retrieved by TTP 220 can then be forwarded to a database (block 750) in topology manager 150 for storage.

Figure 8:
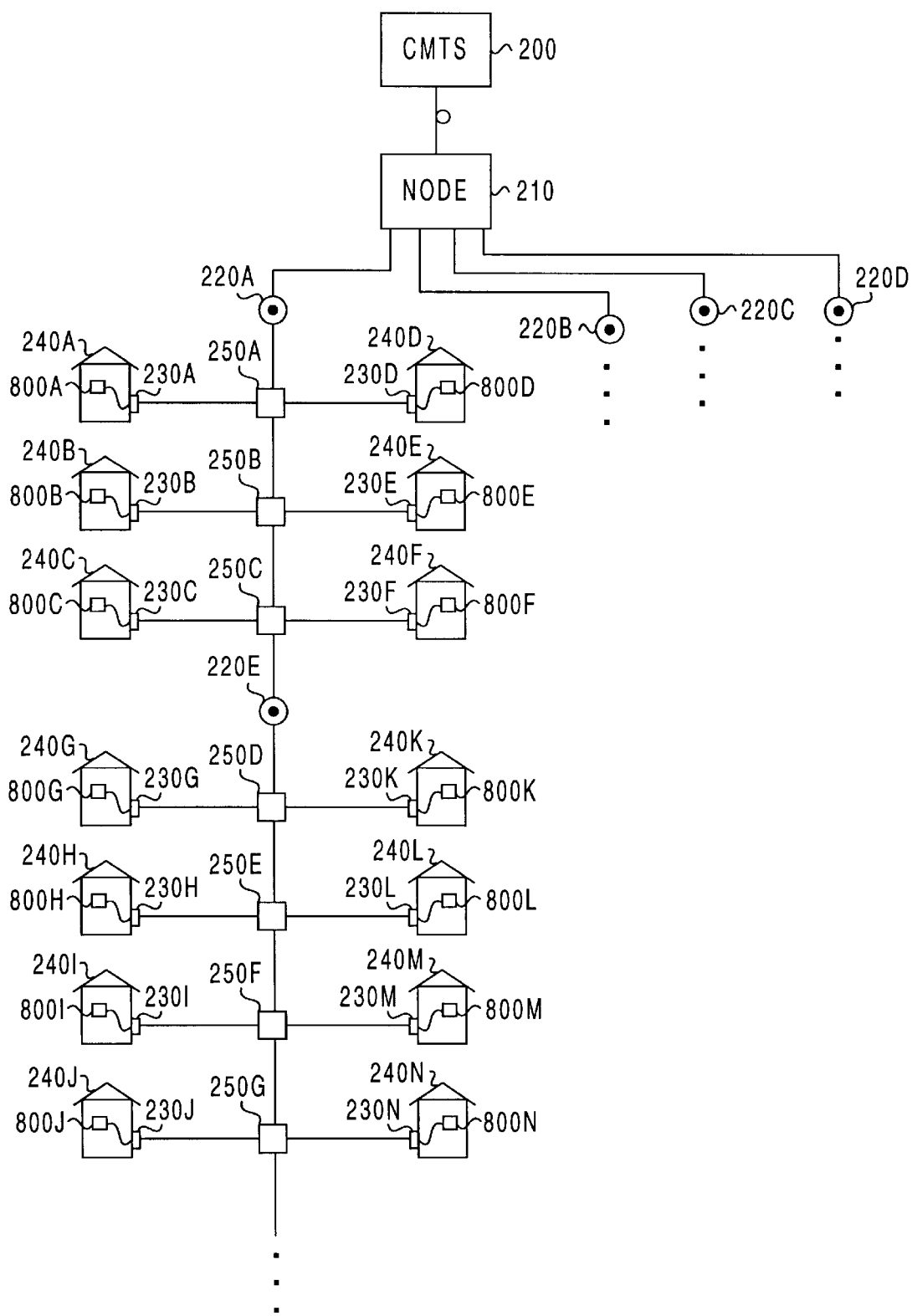
FIG. 8 illustrates a portion of a "discovered" topology, using either of the methods illustrated in FIGS. 7A and 7B.

In either of the topology auto-discovery methods discussed above, TTPs 220 along the same branch will have overlapping sets of detected devices, since a TTP 220 next to a node (such as TTP 220A of FIG. 8) will see all the devices downstream, while another TTP further down the branch (such as TTP 220E) will only see a fraction of those devices. Topology manager 150 can then further process the sets of MAC addresses in its database to assign to each TTP a distinct set of MAC addresses, using techniques from the theory of sets (or any other suitable partitioning technique). In general, these techniques can also be used to discover the topology of the network of TTPs 220. For example, in the diagram of FIG. 8, TTP 220E sees residences 240G–240N, communication gateways 230G–230N and cable modems 800G–800N. TTP 220A, further up the branch, sees all of these devices, plus residences 240A–240F, communication gateways 230A–230F, and cable modems 800A–800F. Therefore, by performing complementary operations, the latter set of devices can be associated with TTP 220A and the former set associated exclusively with TTP 220E.

In an alternative topology discovery method, topology manager 150 can direct each TTP 220 to focus on a vacant channel or test channel. In this embodiment, topology manager 150 also directs each cable modem 800, one at a time, to use the vacant channel. A TTP 220 detecting a signal in the vacant channel, and knowing the address of that particular cable modem, can register the polled cable modem 800 in its set of attached devices. This process can be iterated through each TTP 220 until the topology of the network is completely known.

As discussed above, the HFC access network and network elements are shared among a group of different service providers, with each service provider using specific network elements to support their services. In this environment, a cable modem can be shared between an Internet service provider and a voice service provider. "Mediated access" among these service providers to network elements (such as a cable modem) is therefore desirable.

In one aspect of mediated access, HFC access network manager 100 provides configuration, surveillance and fault performance management of the network elements. In this embodiment, manager 100 collects and processes physical and MAC layer information in both forward (downstream monitoring 110) and return (returning monitoring 130) paths to obtain a measure of transport quality of the entire network, or a section of the network, storing this information in, for example, QoS monitor 140. The measure of transport quality is also provided to authorized service providers and network operators, where direct network element access module 180 maintains a database mapping between each service provider and a subset of network elements within the "access/control" of that service provider. Manager 100 also maintains a security and authorization database for all of the service providers, along with the database of the network topology as discussed above.

Figure 9:
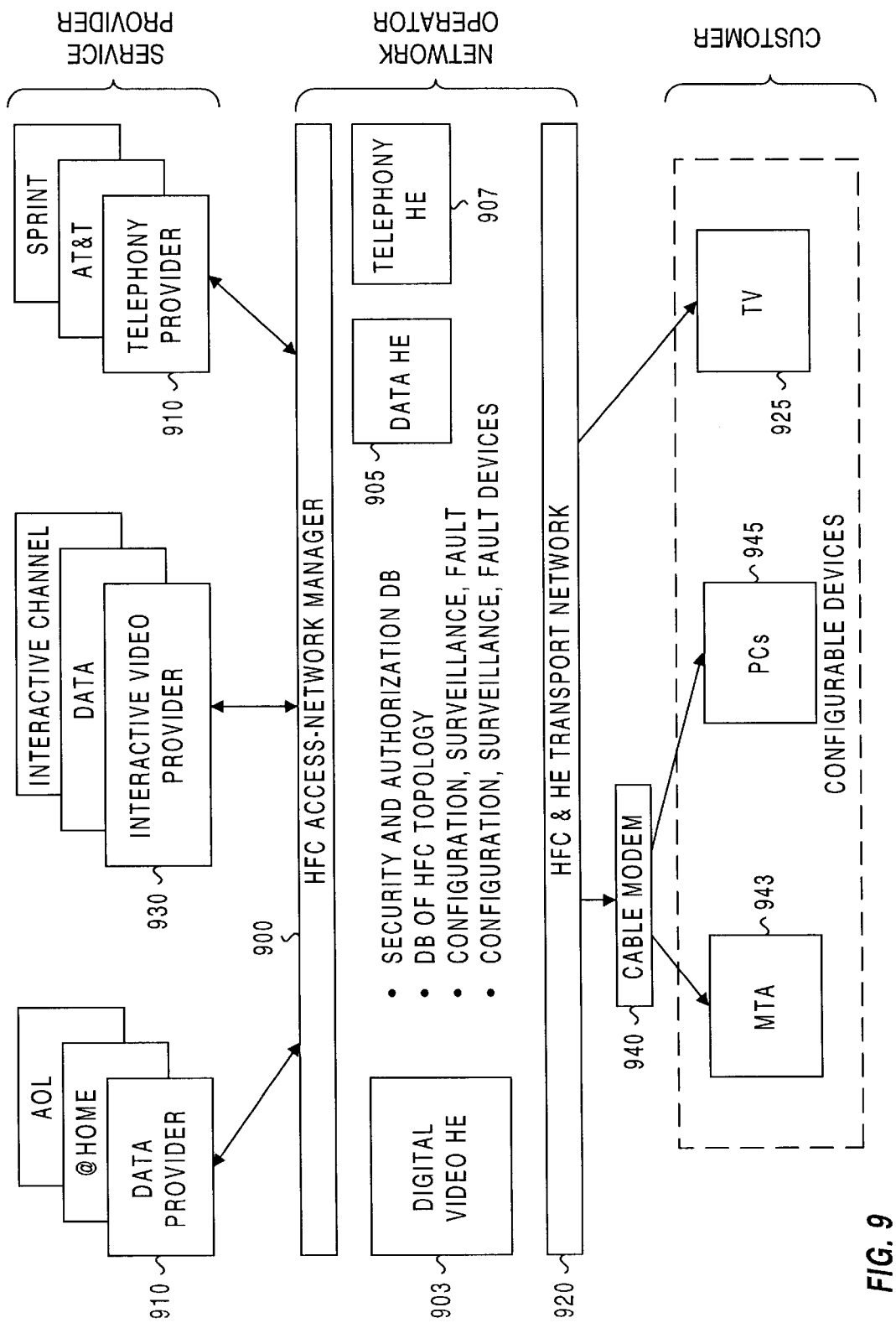
FIG. 9 contains a block diagram illustrating an exemplary mediated access structure of the present invention.

FIG. 9 contains a diagram illustrating the logical structure of the mediated access aspect of manager 100 of the present invention. By using mediated access, each service provider is permitted access to those parts of the HFC access network that will provide them with the appropriate information and control to support their services. A data service provider 910, for example, will have access to data-related head end equipment 905, which may include CMTS 200 or other networking equipment. Data provider 910 may be able to access statistics regarding the reliability of the return path, and may have the ability to execute channel changes, resulting in certain network elements changing the return path frequencies which they utilize. Data provider 910, however, will be precluded from making changes to return path transmission equipment that will interfere with the services provided by other service providers, including video and telephony service providers.

In mediated access, a network operator 900 may have the ability—and contractual responsibility—to insure that reliable downstream transmission and upstream data transport is provided to each of the service providers (illustrated in FIG. 9 as data providers 910, video providers 930 and telephony providers 950). As a result, network operator 900 will be able to access many of the network elements and terminal equipment (defined as any configurable device) such that reliable transport is insured. As an example, network provider 900 may restrict the use of upstream channels when those channels are determined to be unreliable. Network operator 900 may indicate to the service providers that their available spectrum has been restricted to a subset of previously available channels. Mediated access permits each entity (service provider and/or network operator) access to a particular set of network elements and parameters, allowing network management to be performed by more than one service provider.

It is to be understood that the HFC access network manager can interface with existing network equipment management systems, such as the Cheetah technology family of products, CheetahNet and HP Openview's Network Node Manager, to provide topological views of the managed network, including geographical and logical views of the network elements. In particular, mediated access in accordance with the present invention can use the "system administration views" of CheetahTech NetMentor to define access rules related to specific network elements by the network operator and service providers.

What is claimed is:

1. In a hybrid fiber/coax (HFC) access network, an access control system for mediating and controlling the permitted access of a plurality of information service providers to a plurality of network elements, the access control system comprising a security and authorization database including a listing of each information service provider and a mapping between each service provider and a subset of network elements for which each service provider is permitted access;

a quality of service system for collecting and processing forward path and return path signal quality information, and for providing said information to permitted information service providers in accordance with said security and authorization database;

a device configuration module coupled between the plurality of information service providers and the plurality of network elements for permitting predetermined service providers to re-configure selected parameters of predetermined network elements in accordance with the permissions mapped in the security and authorization database.

2. An access control system as defined in claim 1 wherein the system further comprises a diagnostic test element coupled between the plurality of information service providers and the plurality of network elements, said element controlled by said service providers to perform predetermined tests on selected network elements.

3. An access control system as defined in claim 1 wherein the plurality of information service providers comprise data, video and telephony service providers.

4. A method of providing mediated access to a plurality of network elements in an HFC access network by a plurality of information service providers associated with said access network, the method comprising the steps of:

a) creating a database associating each information service provider with a subset of network elements for which each information service provider is permitted surveillance, access and/or configuration permissions;

b) providing a database of the topology of the network elements;

c) upon request from an information service provider, providing access to a selected network element, as controlled by the database created in step a).

5. The method as defined in claim 4 wherein in performing step c), access is permitted to monitor signal path quality.

6. The method as defined in claim 5 wherein in performing step c), forward path signal quality is monitored.

7. The method as defined in claim 5 wherein in performing step c), return path signal quality is monitored.

8. The method as defined in claim 4 wherein in performing step c), transmission bit error rate is monitored to determine signal path quality.

9. The method as defined in claim 4 wherein in performing step c), diagnostic testing of a selected network element is performed by a permitted information service provider.

10. The method as defined in claim 4 wherein in performing step c), configuration of a selected network element is performed by a permitted information service provider.

* * * * *